US009465991B2

(12) United States Patent
Mei et al.

(10) Patent No.: US 9,465,991 B2
(45) Date of Patent: Oct. 11, 2016

(54) DETERMINING LENS CHARACTERISTICS

(71) Applicant: MICROSOFT TECHNOLOGY LICENSING, LLC, Redmond, WA (US)

(72) Inventors: Christopher Maurice Mei, Seattle, WA (US); David Zachris Nister, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 75 days.

(21) Appl. No.: 14/456,723

(22) Filed: Aug. 11, 2014

(65) Prior Publication Data
US 2016/0042221 A1 Feb. 11, 2016

(51) Int. Cl.
G02B 27/01 (2006.01)
G06K 9/32 (2006.01)
G06T 7/00 (2006.01)
G06K 9/00 (2006.01)
G06F 3/01 (2006.01)

(52) U.S. Cl.
CPC ........... G06K 9/0061 (2013.01); G02B 27/017 (2013.01); G06F 3/013 (2013.01); G06K 9/00597 (2013.01); G06K 9/00604 (2013.01); G06K 9/3233 (2013.01); G06T 7/0042 (2013.01); G06T 7/0079 (2013.01); G02B 2027/014 (2013.01); G02B 2027/0138 (2013.01); G02B 2027/0178 (2013.01); G02B 2027/0187 (2013.01); G06T 2207/10004 (2013.01); G06T 2207/10152 (2013.01)

(58) Field of Classification Search
None
See application file for complete search history.

(56) References Cited

U.S. PATENT DOCUMENTS 7,742,621 B2  6/2010 Hammoud et al.
8,487,838 B2 * 7/2013 Lewis .................... A61B 3/113
345/8

(Continued)

FOREIGN PATENT DOCUMENTS

EP      2499960 A1   9/2012
WO  2006101941 A2   9/2006
WO  2007062478 A1   6/2007

OTHER PUBLICATIONS

Gwon, et al., "Gaze Tracking System for User Wearing Glasses", In Proceedings of Sensors, vol. 14, Issue 2, Jan. 27, 2014, 25 pages.

(Continued)

*Primary Examiner* — Utpal Shah
(74) *Attorney, Agent, or Firm* — Dan Choi; Micky Minhas

(57) ABSTRACT

Embodiments relating to determining characteristics of eyeglass lenses are disclosed. A head-mounted display device comprises a camera communicatively coupled to a computing device and including an optical axis having a center point. Light sources are configured to emit light rays toward the lens to produce lens glints. The light sources are in a light source plane that is spaced from a lens plane by an offset distance of between 8 mm and 12 mm. The light sources are either spaced vertically from a line perpendicular to the light source plane and extending through the center point by a distance between 13 mm and 53 mm, or spaced horizontally from the line by a distance of between 13 mm and 80 mm. Lens characterization program logic identifies an image location of each lens glint, and outputs an estimated lens shape model comprising the one or more lens characteristics.

20 Claims, 12 Drawing Sheets

(56) References Cited

U.S. PATENT DOCUMENTS

| | | | | |
|---|---|---|---|---|
| 8,752,963 | B2* | 6/2014 | McCulloch | H04N 13/044 351/158 |
| 8,814,691 | B2* | 8/2014 | Haddick | G02B 27/017 463/30 |
| 9,229,227 | B2* | 1/2016 | Border | G02B 27/0093 |
| 2010/0328444 | A1* | 12/2010 | Blixt | A61B 3/113 348/78 |
| 2011/0170061 | A1* | 7/2011 | Gordon | A61B 3/113 351/206 |
| 2012/0242678 | A1* | 9/2012 | Border | G02B 27/0093 345/589 |
| 2013/0178287 | A1* | 7/2013 | Yahav | G02B 27/01 463/32 |

OTHER PUBLICATIONS

Ying, et al., "Robust Feature Extraction for Non-contact Gaze Tracking with Eyeglasses", In Chinese Journal of Electronics, vol. 22, Number, Apr. 2013, 6 pages.

Bialkowski, et al., "A Non-Intrusive Approach to Gaze Estimation", In Proceedings of the 8th International Conference on Computer Vision, Pattern Recognition, and Image Processing, 2007, 7 pages.

Ebisawa, Yoshinobu, "Improved Video-Based Eye-Gaze Detection Method", In IEEE Transactions on Instrumentation and Measurement Society, vol. 47, No. 4, Aug. 1998, 8 pages.

Dahlberg, "Eye Tracking With Eye Glasses", Umea University Department of Physics SE-901 87 Umea Swede, Jan. 25, 2010, 66 pages.

Bohme, M. et al., "Remote Eye Tracking: State of the Art and Directions for Future Development", In Proceedings of The 2nd Conference on Communication by Gaze Interaction—COGAIN 2006: Gazing Into the Future, Sep. 4, 2006, 5 pages.

ISA European Patent Office, International Search Report and Written Opinion Issued in Application No. PCT/US2015/044401, Nov. 9, 2015, WIPO, 14 pages.

IPEA European Patent Office, Second Written Opinion issued in PCT Application No. PCT/US2015/044401, Jul. 4, 2016, WIPO, 6 pages.

* cited by examiner

DETERMINING LENS CHARACTERISTICS

Eye-tacking or gaze-tracking systems and techniques may be utilized to determine a direction and/or location of a person's gaze. In some examples, a light source may illuminate the eye of a user and a corresponding camera may capture images of the eye. Such images may include reflections from the cornea of the eye, or "glints." Positions of the pupil and glints from captured images may be utilized to determine a direction and/or location of a user's gaze in a surrounding environment.

However, in situations where a user is wearing eyeglasses, the lenses of the eyeglasses can alter the path of light rays reflected from the user's eyes. For example, corrective lenses may bend light rays in varying manners depending upon the shape, prescription, and/or other aspects of the lenses. Such alterations in the light rays' paths may degrade the ability of a gaze tracking system to accurately determine positions of the glints and/or pupil. Accordingly, the accuracy of an estimated direction and/or location of a person's gaze may suffer.

SUMMARY

Various embodiments are disclosed herein that relate to systems and methods for determining one or more characteristics of a lens of eyeglasses. For example, one disclosed embodiment comprises a head-mounted display device comprising a frame and a camera mounted to the frame. The camera is communicatively coupled to a computing device and comprises an optical axis that includes a center point.

A plurality of light sources are mounted to the frame and configured to emit light rays toward the lens to produce a plurality of lens glints from the lens. The plurality of light sources are located in a light source plane that is spaced from a lens plane of the lens, with the light source plane being spaced from the lens plane by an offset distance of between 8 mm and 12 mm. The plurality of light sources are either (1) spaced vertically from a line perpendicular to the light source plane and extending through the center point of the optical axis of the camera by a vertical light source distance of between 13 mm and 53 mm, or (2) spaced horizontally from the line perpendicular to the light source plane and extending through the center point of the optical axis of the camera by a horizontal light source distance of between 13 mm and 80 mm.

Lens characterization program logic is executed by a processor of the computing device and is configured to identify an image location of each of the plurality of lens glints in an image captured by the camera. Using the image locations of the plurality of lens glints in the image, the lens characterization program logic outputs an estimated lens shape model comprising the one or more characteristics of the lens of the eyeglasses.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
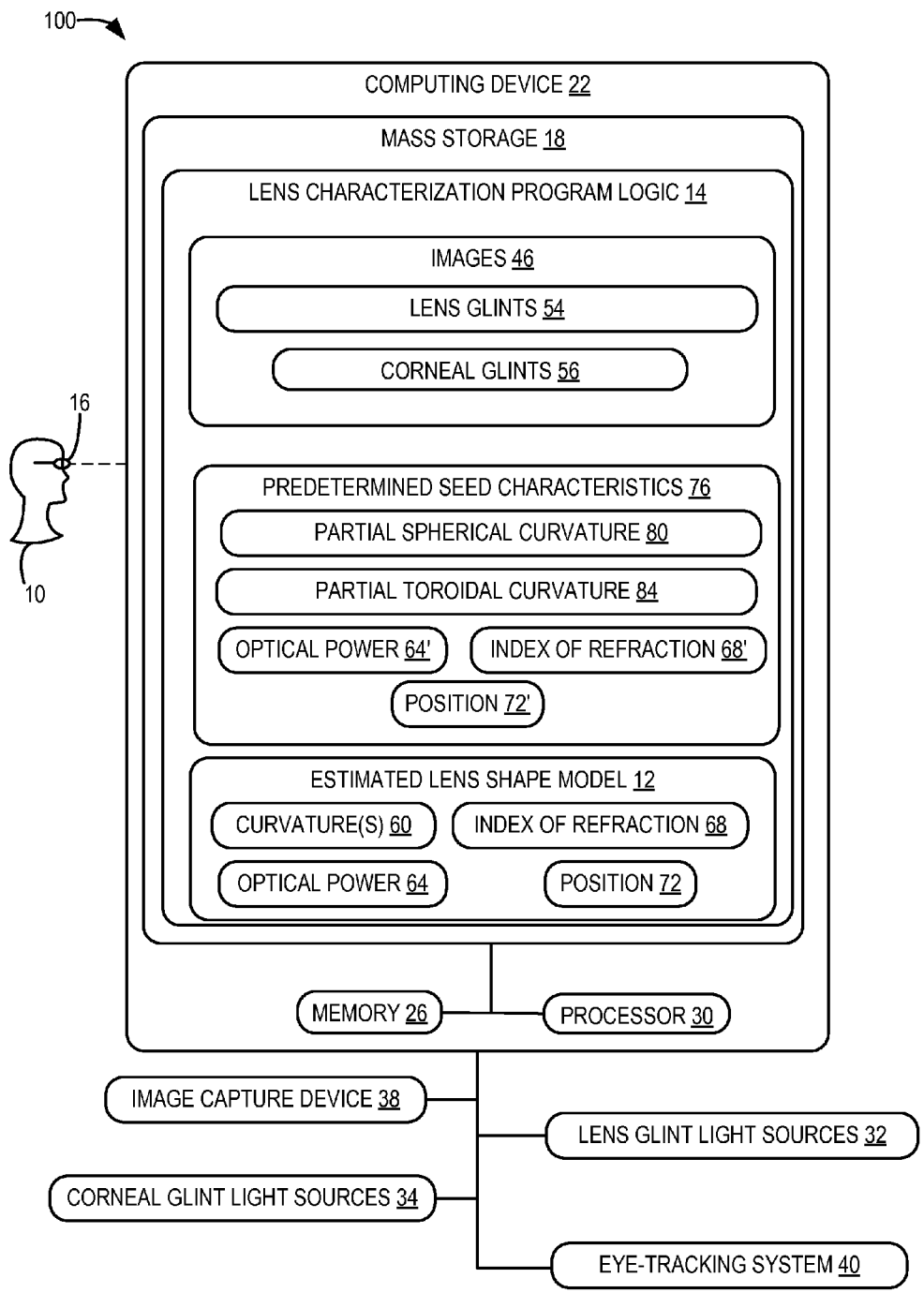
FIG. 1 is a schematic view of a system for determining one or more characteristics of a lens of eyeglasses according to an example of the present disclosure.

FIG. 1 shows a schematic view of one implementation of a system 100 for determining one or more characteristics of a lens of eyeglasses. The system 100 includes lens characterization program logic 14 that may be stored in mass storage 18 of a computing device 22. The lens characterization program logic 14 may be loaded into memory 26 and executed by a processor 30 of the computing device 22 to perform one or more of the methods and processes described in more detail below.

As described in more detail below, the system 100 includes a plurality of lens glint light sources 32 such as, for example, LED light sources. In some examples the lens glint light sources 32 may comprise infrared light sources that emit infrared light, such as an infrared LED. In other examples the lens glint light sources 32 may comprise visible light sources that emit visible light, such as a visible LED. The system 100 also may include one or more corneal glint lens glint light sources 34. As with the lens glint light sources 32, in some examples the corneal glint light sources 34 may comprise IR or visible light sources, such as an LED. In some examples, the lens glint light sources 32 and/or corneal glint light sources 34 may comprise structured light sources.

As described in more detail below, the lens glint light sources 32 and the corneal glint light sources 34 may emit light along outbound light paths to the eyes of a user 10 who is wearing glasses 16. The system 100 further includes one or more image capture devices 38 that are configured to capture images of the light that is reflected and scattered from the glasses 16 and the eye of the user 10. It will be appreciated that in some examples, light from lens glint light sources 32 and from corneal glint light sources 34 may create corneal reflections. In some examples, system 100 may utilize only lens glint light sources 34 that create both lens glints 54 and corneal glints 56, as described in more detail below.

Such images may be provided to an eye-tracking system 40 that may be configured to determine gaze directions of one or both of a user's eyes in any suitable manner. For example, the eye-tracking system 40 may utilize images of the pupil and corneal reflections that generate corneal glints to determine a center of the pupil and locations of the glints. A vector between the glints and the pupil center may be used to determine a gaze location of the eye. In some examples, the eye-tracking system 40 may utilize an underlying geometric model to estimate a gaze direction of the eye.

In one example a bright pupil technique may be utilized in which the illuminated light from the corneal glint light sources 34 is coaxial with the optical path of the eye, causing the light to reflect off the retina. In other examples, a dark pupil technique may be utilized in which the illuminated light is offset from the optical path. Images of the corneal glints and of the pupils as determined from image data gathered from the image capture device(s) 38 may be used to determine an optical axis of each eye.

Using this information, eye-tracking system 40 may determine a direction and/or at what physical object or virtual object the user is gazing. The eye-tracking system 40 may further determine at what point on a physical or virtual object the user is gazing. Such gaze tracking data may then be provided to the computing device 22, and may be utilized by one or more applications or other programs as needed.

In some examples, the computing device 22, lens glint light sources 32, corneal glint light sources 34, and image capture device(s) 38 may be integrated into a common enclosure to form a single device. Such devices may include, but are not limited to, head-mounted display (HMD) devices, desktop computers, PCs, hand-held smart phones, e-readers, laptop, notebook and tablet computers, standalone displays, etc. For example and with reference to FIG. 2, a tablet user 202 wearing glasses 206 may utilize a tablet 210 that comprises system 100. The tablet 210 may include lens glint light sources 32, corneal glint light sources 34 and an image capture device 38. In another example and as described in more detail below, an HMD user 220 may wear an HMD device 224 over his glasses.

In other examples, one or more of the lens glint light sources 32, corneal glint light sources 34, and image capture device(s) 38 may be physically separate from and communicatively coupled to the computing device 22. In one example, the lens glint light sources 32, corneal glint light sources 34 and an image capture device 38 may be located in a desktop display, and may be communicatively coupled to a computing device 22 in a separate component, such as a gaming console, via a wired or wireless connection. It will be appreciated that many other types and configurations of systems 10 having various form factors may also be used and are within the scope of the present disclosure.

The computing device 22 may take the form of a desktop computing device, a mobile computing device such as a smart phone, laptop, notebook or tablet computer, network computer, home entertainment computer, interactive television, gaming system, or other suitable type of computing device. Additional details regarding the components and computing aspects of the computing device 22 are described in more detail below with reference to FIG. 12.

With reference now also to FIGS. 3-11, descriptions of example implementations of the system 100 will now be provided. In one example schematically shown in FIG. 3, HMD user 220 may be wearing eyeglasses 304 and a head-mounted display (HMD) device 224 incorporating system 100 over the eyeglasses.

The HMD device 224 may comprise a transparent, semi-transparent or non-transparent display 312 that is supported in front of a user's left eye 316 and right eye 318 and the eyeglasses 304. In some examples, the HMD device 224 may create and display to the user 220 an augmented reality or mixed-reality environment that includes one or more computer generated images that are displayed among one or more real-world objects in a physical environment viewed through the device. The computer generated images may comprise three-dimensional (3D) holographic images, two-dimensional (2D) images, or other forms of virtual images that are generated and displayed via HMD device 224. The HMD device 224 may thereby enable the user 220 to view such computer generated images within the physical environment surrounding the viewer.

As described in more detail below, the HMD device 224 may include various sensors and related systems that receive physical environment data from the physical environment. For example, the HMD device 224 may include a depth sensor system that includes one or more depth cameras that generate depth image data from real-world objects in the surrounding physical environment. In some examples the HMD device 224 may include an optical sensor system that utilizes at least one outward facing sensor, such as an RGB camera or other optical sensor. The outward facing sensor may capture two-dimensional image information from real-world objects in the physical environment. The HMD device 224 may also include a position sensor system comprising one or more accelerometers, gyroscopes, head tracking systems, and/or other sensors for determining a position or orientation of a user.

In some examples the HMD device 224 may include a transducer system comprising one or more actuators that convert an electrical signal into another form of energy. The transducer system may include one or more speakers for providing audio feedback to a viewer. In other examples the transducer system may include one or more tactile transducers for generating and providing haptic feedback to the viewer, such as vibrations. The HMD device 224 may also include a microphone system and one or more microphones for receiving audio input from the physical environment.

Figure 3:
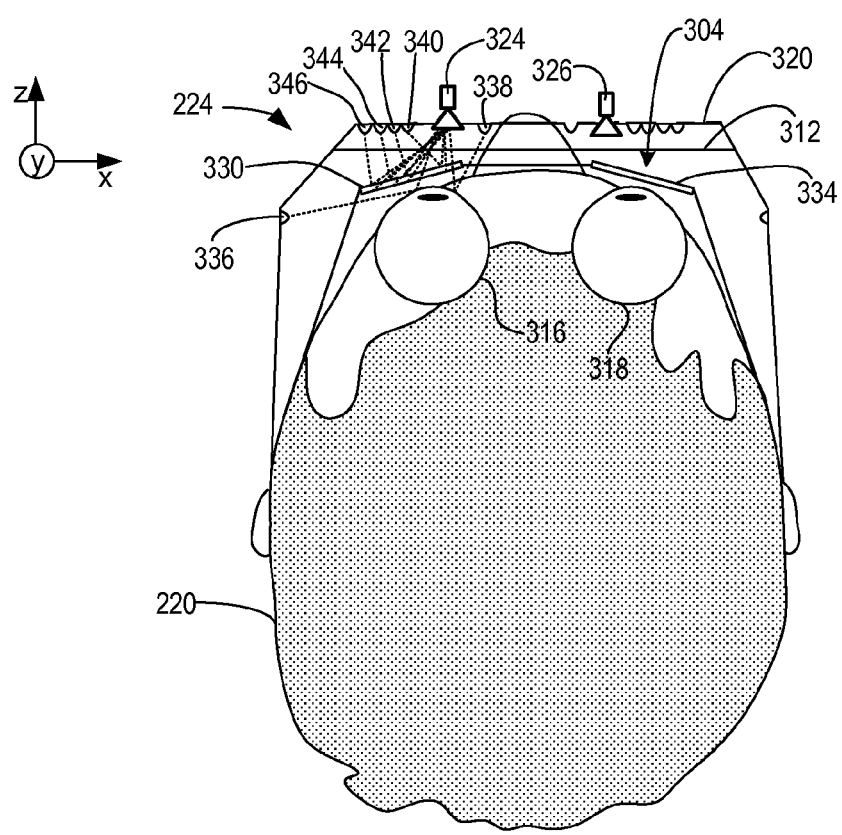
FIG. 3 is a schematic top view of a system for determining one or more characteristics of a lens of eyeglasses according to an example of the present disclosure.

The example HMD device 224 illustrated in FIG. 3 may include the computing device 22 integrated into the HMD device. It will be appreciated that in other examples the computing device 22 may be a separate component from the HMD device 224. Many types and configurations of HMD devices having various form factors also may be used and are within the scope of the present disclosure. A more detailed description of an example HMD device is provided below with reference to FIG. 10.

With continued reference to FIGS. 1 and 3, the HMD device 224 includes a frame 320 to which image capture devices 38 in the form of cameras are mounted. As shown in FIG. 3, in this example one camera 324 is provided to capture images 46 of left eye 316 and left lens 330, and another camera 326 is provided to capture images of right eye 318 and right lens 334. The cameras 324 and 326 are communicatively coupled to computing device 22. It will be appreciated that in other examples, a single camera or 3 or more cameras may be utilized to capture images of the eyes and lenses. In some examples, left lens 330 and right lens 334 may have a width in the x-axis direction of 50 mm and a height in the y-axis direction of 30 mm.

Figure 4:
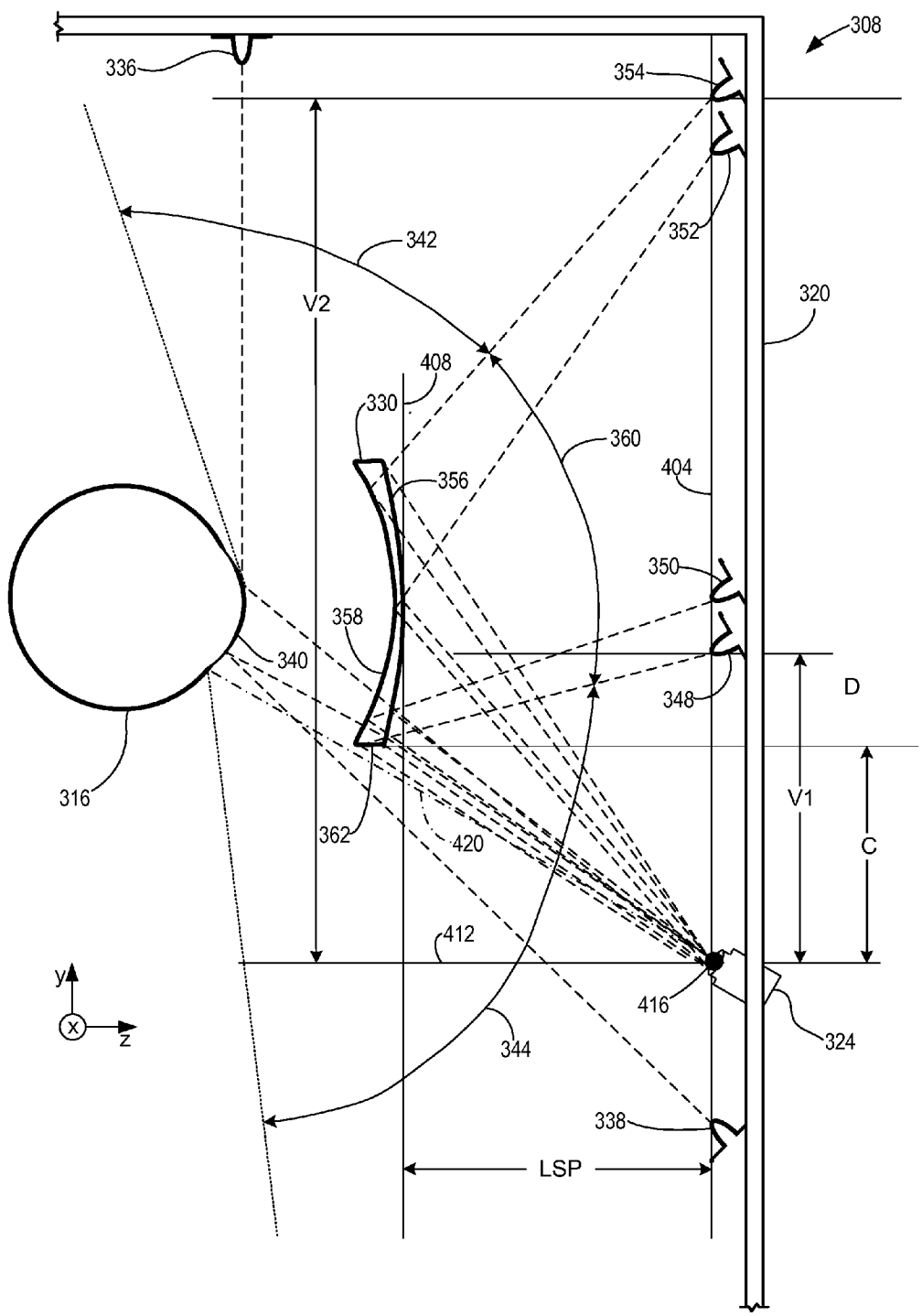
FIG. 4 is a schematic side view of a system for determining one or more characteristics of a lens of eyeglasses according to an example of the present disclosure.

FIG. 4 provides a schematic side view illustration of the left eye 316 and corresponding left-side portion of the example HMD device 224 shown in FIG. 3. The following descriptions of the example shown in FIGS. 3 and 4 are provided with respect to the left lens 330 and related left-side components of an HMD device, and the corresponding geometric relationships and relative locations of such components. It will be appreciated that such descriptions of component configurations, geometric relationships and relative locations of components also apply to the right-side components of HMD device 224, as schematically illustrated in FIG. 3.

Similarly, the following descriptions of the examples shown in FIGS. 5-9 are provided with respect to a left lens and related left-side components of an HMD device, and the corresponding geometric relationships and relative locations of such components. Such descriptions of component configurations, geometric relationships and relative locations of components also apply to the right-side components of the HMD device, as well as other potential configurations of system 100 discussed above.

Figure 2:
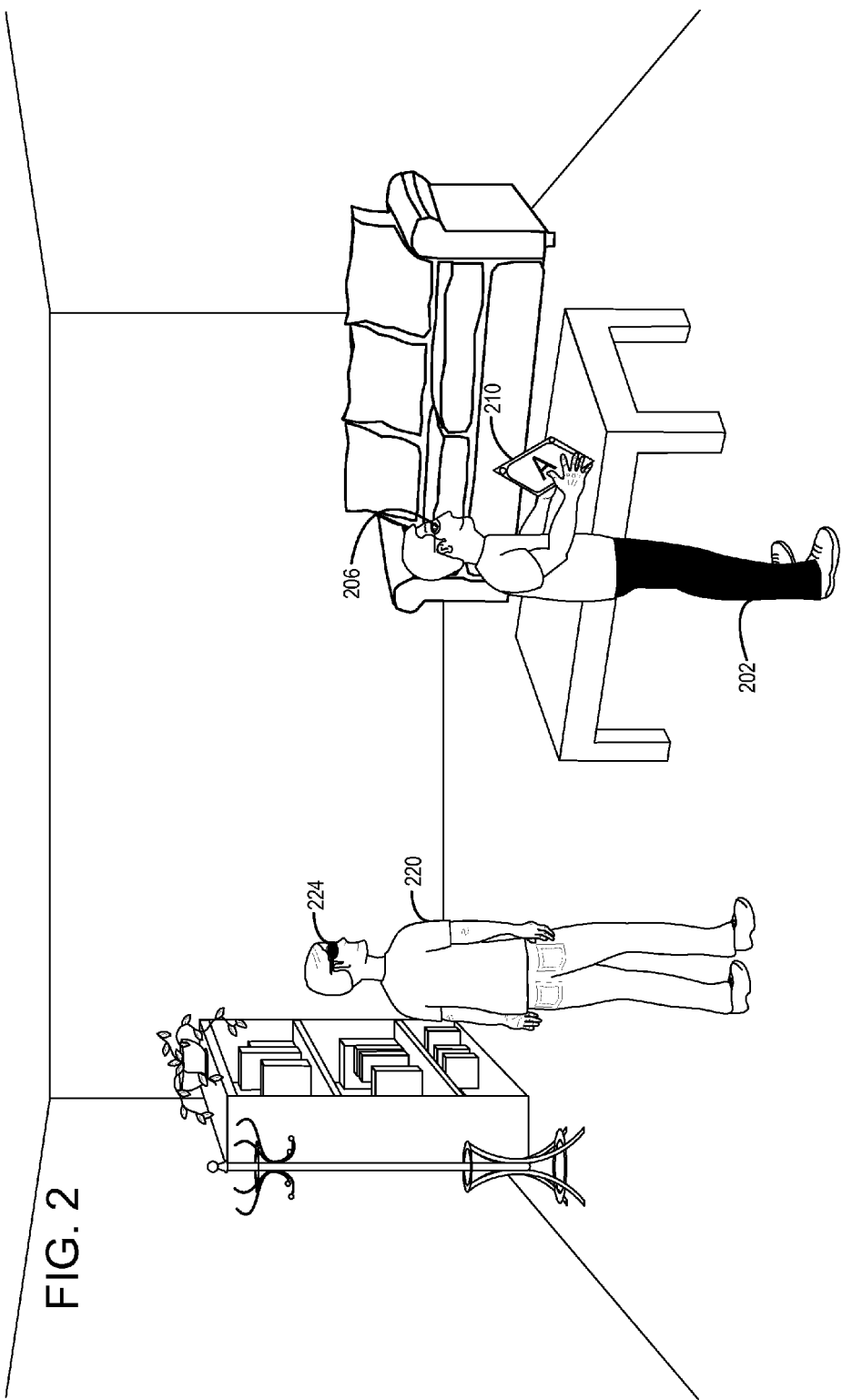
FIG. 2 is a schematic perspective view of a room including two users wearing glasses, with one user also wearing a head-mounted display device and the other user holding a tablet computer comprising a system according to an example of the present disclosure.

In the example of FIGS. 3 and 4, 2 corneal glint light sources 336 and 338 are mounted on frame 320 of HMD device 224 and configured to emit light rays that impinge on the cornea 340 of the left eye 316 without passing through the left lens 330. Accordingly and in one potential advantage of the present disclosure, the 2 corneal glint light sources 336 and 338 are positioned on the frame 320 to provide reflections off the cornea 340 and prevent reflections off the left lens 330. In this example, these light rays are reflected from the cornea 340, through the left lens 330 and to the camera 324. In this manner, such light rays produce corneal glints 56 from the cornea 340 that may be utilized by the eye-tracking system 40 to generate eye tracking data as described above.

As schematically shown in FIG. 4, and to provide reflections off the cornea 340 while avoiding reflections off the left lens 330, corneal glint light source 336 may be located on frame 320 within in a region defined by arc 342. Similarly, corneal glint light source 338 may be located on frame 320 within in a region defined by arc 344. In some examples, the region defined by arc 344 may be defined by emitting a bounding ray from the camera 324 that grazes the bottom edge 362 of the left lens 330 and impinges on the cornea 340 of the eye 316. The reflection off the cornea 349 will then define the region to position the LED. A similar process may be followed to establish the region defined by arc 342.

It will be appreciated that light rays that are emitted from lens glint light sources 348, 350 and/or corneal glint light sources 336, 338 and are reflected from the cornea 340, and then pass through left lens 330 will be altered by optical characteristics of the lens. As noted above, such alterations may degrade the ability of an eye-tracking system 40 to accurately determine positions of corneal glints 56 and/or the pupil of the eye. The accuracy of an estimated direction and/or location of a person's gaze may correspondingly suffer.

It will also be appreciated that in some examples, light rays emitted by one or more corneal glint light sources 34 may reflect off a cornea and be received by an image capture device 38 without passing through a lens of eyeglasses worn by a user. In these examples, one or more other corneal glint light sources 34 may emit light rays that reflect off a cornea and are received by an image capture device 38 after passing through a lens of eyeglasses.

In the example of FIGS. 3 and 4 and in one potential advantage of the present disclosure, 4 lens glint light sources 348, 350, 352 and 354 are mounted on a left side of the HMD 224 and configured to emit light rays toward the left lens 330 to produce lens glints 54 from the lens. As schematically shown in FIG. 4, and to provide reflections off the left lens 330, each of the lens glint light sources 348, 350, 352 and 354 may be located on frame 320 within in a region defined by arc 360. As shown in FIG. 4, left lens 330 includes an outer surface 356 facing away from the left eye 316 and an inner surface 358 facing the left eye. Accordingly, the 4 lens glint light sources 348, 350, 352 and 354 may be positioned on frame 320 to emit light rays that reflect from both the outer surface 356 and the inner surface 358 of the left lens 330 to produce 8 lens glints 54 that may be received by camera 324.

Figure 5:
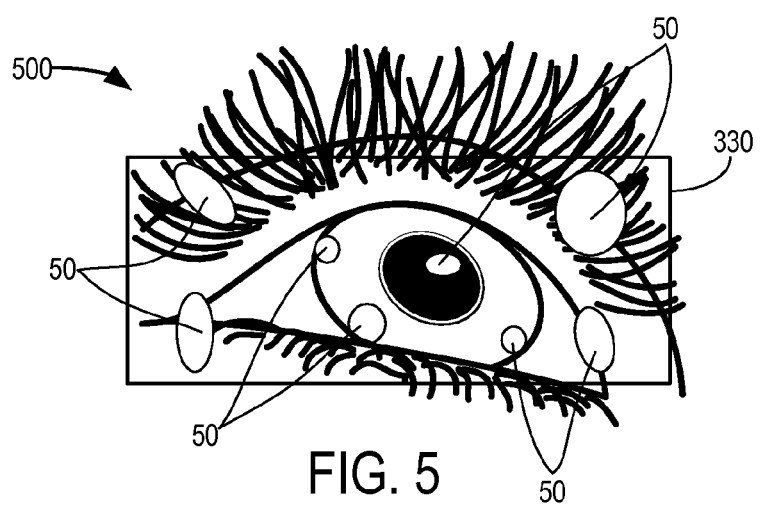
FIG. 5 is a schematic view of an image comprising lens glints from a lens of eyeglasses according to an example of the present disclosure.

FIG. 5 is a schematic illustration of an image 500 captured by the camera 324 and showing the left eye 316, left lens 330 (schematically represented as a rectangle), and 8 lens glints 54 produced by the 4 lens glint light sources 348, 350, 352 and 354. In the image 500 the 8 lens glints 54 are shown at various locations on the left lens 330. It will be appreciated that the shape and location of the lens glints 54 may vary based upon one or more characteristics of the left lens 330. Such characteristics may at least partially define an estimated lens shape model 12.

For example, the curvatures 60 of the outer surface 356 and the inner surface 358 of left lens 330, and the relationship of the two curvatures (the lens form), may influence the shape and locations of lens glints 54. Other characteristics of the left lens 330 may include, but are not limited to, an optical power 64 of the lens, an index of refraction 68 of the lens, a position 72 of the lens, and a thickness of the lens. An optical power of the lens expresses the degree to which the lens converges or diverges light. The index of refraction of a lens describes how light propagates through the lens. The position of the lens may describe the location of the lens relative to the camera 324 and/or the adjacent eye 316.

Utilizing the image 500 captured by camera 324, the lens characterization program logic 14 of system 100 may be configured to identify an image location of each of the lens glints 54 in the image. Using these image locations, the lens characterization program logic 14 may be configured to determine and output an estimated lens shape model 12 comprising one or more characteristics of the left lens 330 of the eyeglasses 304.

In one example, the lens characterization program logic 14 may be configured to use one or more predetermined seed characteristics 76 of left lens 330 to determine a predicted location for each of the lens glints 54. Alternatively expressed, the lens characterization program logic 14 may use one or more predetermined seed characteristics 76 of left lens 330 to generate an initial estimated lens shape model that is used to determine the predicted locations. In some examples, the predetermined seed characteristics 76 may comprise a partial spherical curvature 80 of the left lens 330. In other examples, the predetermined seed characteristics 76 may comprise a partial toroidal curvature 84 of the left lens 330. Where the predetermined seed characteristics 76 comprise a partial toroidal curvature 84 of the left lens 330, the computational resources for determining a predicted location for each of the lens glints 54 may be reduced.

Other predetermined seed characteristics may include, but are not limited to, an optical power 64' of the lens, an index of refraction 68' of the lens, and a position 72' of the lens. An optical power of the lens may include, but is not limited to, a cylindrical power. In some examples, the lens characterization program logic 14 also may be configured to establish a relationship between the curvatures 60 of the outer surface 356 and the inner surface 358 of left lens 330 that corresponds to Tscherning's ellipse.

As noted above, the lens characterization program logic 14 may be configured to use one or more predetermined seed characteristics 76 of left lens 330 to determine a predicted location for each of the lens glints 54. The lens characterization program logic 14 then may compute an error between each of the predicted locations of the lens glints 54 and a corresponding one of the image locations of the lens glints in the image 500. For example, a predicted pixel position of a predicted location may be compared to an actual pixel location of the corresponding lens glint 50 in the image 500.

The lens characterization program logic 14 may then iteratively minimize such errors to optimize for one or more characteristics of the left lens 330 and thereby generate the estimated lens shape model 12. In one example, the errors may be iteratively minimized using a regression analysis, such as a least squares approach. In other examples, a full parametric characterization of the left lens 330 may be generated. In such examples, 5 or more lens glint light sources 32 may be utilized to produce 10 or more lens glints 54.

The lens characterization program logic 14 may be configured to receive another image 46 from camera 324 comprising corneal glints 56 that are generated by the corneal glint light sources 336 and 338. Using this image 46 the lens characterization program logic 14 may determine an initial position of each of the corneal glints 56 in the other image 46. Using the estimated lens shape model 12, the lens characterization program logic 14 may adjust the position of each of the corneal glints 56 to an adjusted position that accounts for the effects of the left lens 330 on the light rays generating the corneal glints. The lens characterization program logic 14 then may output the adjusted positions of each of the corneal glints 56 to the eye-tracking system 40. In this manner, the lens characterization program logic 14 may correct for the effects of the left lens 330 on the light rays generating the corneal glints as received at the camera 324, and thereby provide more accurate data to the eye-tracking system 40.

It will also be appreciated that an estimated lens shape model 12 generated by system 100 may be utilized in various applications in addition to or other than eye-tracking systems. For example, system 100 may output an estimated lens shape model 12 to an iris recognition system, which may utilize the model to synthesize an "eye glasses invariant" image of the eye.

FIGS. 3 and 4 schematically illustrate one example configuration of relative positional relationships among lens glint light sources 348, 350, 352, and 354, corneal glint light sources 336 and 338, and camera 324 for creating lens glints 54 and corneal glints 56 as described above. As shown in the example of FIG. 4, the lens glint light sources 348, 350, 352, and 354 may be located in a light source plane 404 that is parallel to a lens plane 408 of the left lens 330. In some examples and as illustrated in FIG. 4, the lens plane 408 may extend through a central point of left lens 330 in the x-y space. For example, where the lens 330 has a width of 50 mm and a height of 30 mm, the central point of the lens may be located 25 mm from either side edge and 15 mm from the top or bottom edge of the lens. In some examples, the light source plane 404 may be spaced from the lens plane 408 by an offset distance LSP in a z-axis direction of between 8 mm and 30 mm.

In some examples, the lens plane 408 may have a curvature that matches the outer surface 356 of left lens 330, and the light source plane 404 may have a curvature that matches or follows the curvature of the lens plane. In some examples, one or more of the lens glint light sources may not be located on the light source plane 404, provided that such light sources are spaced from the lens by offset distance LSP as described above and shown in FIG. 4, or by an offset distance LSP as shown in the examples of FIGS. 6-9 described in more detail below.

In the example of FIG. 4 offset distance LSP may be 30 mm, and a center point 416 of an optical axis 420 of the camera 324 also may be located in light source plane 404 and at a distance C of 10 mm below a bottom edge 362 of the left lens 330. Additionally, each of the lens glint light sources 348, 350, 352, and 354 may be spaced vertically in a y-axis direction from a line 412 that is perpendicular to the light source plane 404 and extends through the center point 416 by a vertical light source distance of between 13 mm and 80 mm. For example, lens glint light source 348 may be spaced vertically in the y-axis direction from line 412 by vertical light source distance V1 of 13 mm, and lens glint light source 354 may be spaced vertically in the y-axis direction from line 412 by vertical light source distance V2 of 80 mm.

In the example of FIG. 4, corneal glint light sources may be spaced vertically in the y-axis direction from the line 412 by a vertical light source distance that is either less than 13 mm or greater than 80 mm from line 412. In the example of FIG. 4, corneal glint light source 338 is spaced vertically in the y-axis direction from the line 412 by a vertical light source distance that is greater than vertical light source distance V2 of 80 mm. Corneal glint light source 336 is spaced vertically in a negative y-axis direction from the line 412 by a vertical light source distance that is less than vertical light source distance V1 of 13 mm. As shown in this example, corneal glint light source 338 is located below the camera 324. Additionally, corneal glint light source 336 is spaced from the light source plane 404 in the negative z-axis direction. In other examples, corneal glint light source 336 may be coplanar with the light source plane 404.

As noted above, FIG. 4 is schematic side view of system 100. In some examples, each of the lens glint light sources 348, 350, 352, and 354 may be spaced horizontally in a positive x-axis direction from the center point 416 of camera 324 by a maximum distance of 50 mm. In some examples, each of the lens glint light sources 348, 350, 352, and 354 may be equally spaced in the x-axis direction from the center point 416. In other examples, one or more of the lens glint light sources 348, 350, 352, and 354 may be spaced in the x-axis direction from the center point 416 by different distances.

Figure 6:
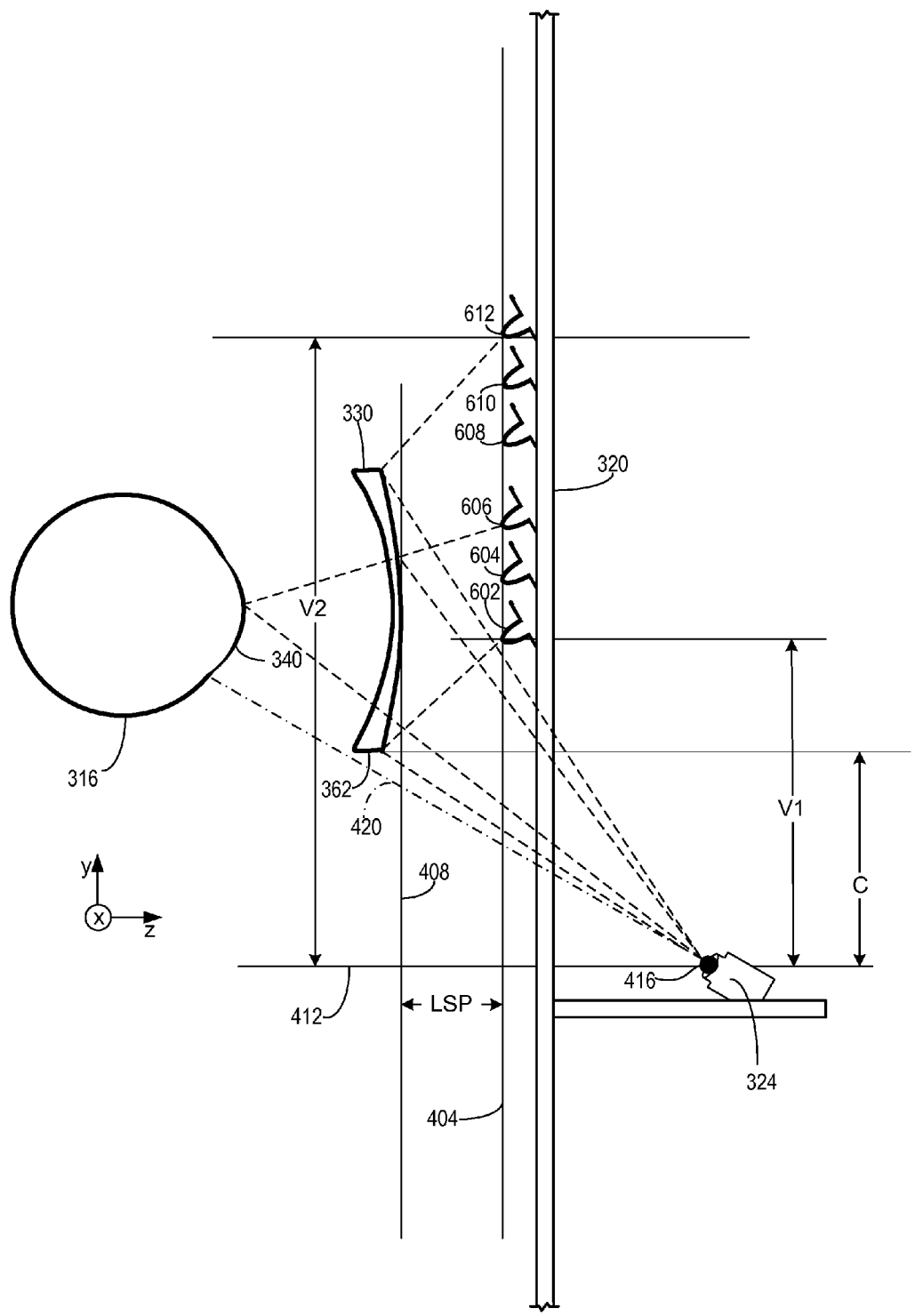
FIG. 6 is a schematic side view of a system for determining one or more characteristics of a lens of eyeglasses according to another example of the present disclosure.

With reference now to FIG. 6, a schematic side view of system 100 according to another example of the present disclosure is provided. In this example, 6 lens glint light sources 602, 604, 606, 608, 610, and 612 may be utilized and may be located in the light source plane 404 that is parallel to the lens plane 408 of the left lens 330. In this example, the light source plane 404 may be spaced from the lens plane 408 by an offset distance LSP in a z-axis direction of between 8 mm and 12 mm.

In some examples, light source plane 404 may be spaced from the lens plane 408 by an offset distance LSP in a z-axis direction of 10 mm. The camera 324 may be spaced from the light source plane 404 in the z-axis direction by 20 mm, and may be spaced from the lens plane 408 in the z-axis direction by 30 mm. The camera 324 also may be located a distance C of 10 mm below the bottom edge 362 of the left lens 330. Additionally, each of the lens glint light sources 602, 604, 606, 608, 610, and 612 may be spaced vertically in a y-axis direction from line 412 that is perpendicular to the light source plane 404 and extends through center point 416 of optical axis 420 of the camera 324 by a vertical light source distance of between 13 mm and 53 mm. For example, lens glint light source 602 may be spaced vertically in the y-axis direction from line 412 by vertical light source distance V1 of 13 mm, and lens glint light source 612 may be spaced vertically in the y-axis direction from line 412 by vertical light source distance V2 of 53 mm.

In the example of FIG. 6, separate corneal glint light sources may not be utilized. In this example, light emitted from one or more lens glint light sources 602, 604, 606, 608, 610, and 612 may travel through lens 330, reflect off the cornea 340, and be received by camera 324. As noted above, FIG. 6 is schematic side view of system 100. In some examples, each of the lens glint light sources 602, 604, 606, 608, 610, and 612 may be spaced horizontally in a positive x-axis direction from the center point 416 of camera 324 by a maximum distance of 50 mm. In some examples, each of the lens glint light sources 602, 604, 606, 608, 610, and 612 may be equally spaced in the x-axis direction from the center point 416. In other examples, one or more of the lens glint light sources 602, 604, 606, 608, 610, and 612 may be spaced in the x-axis direction from the center point 416 by different distances. Additionally, in some examples the camera 324 may be located adjacent to the nose of a user wearing the HMD device 224 in a "nasal camera position."

Figure 7:
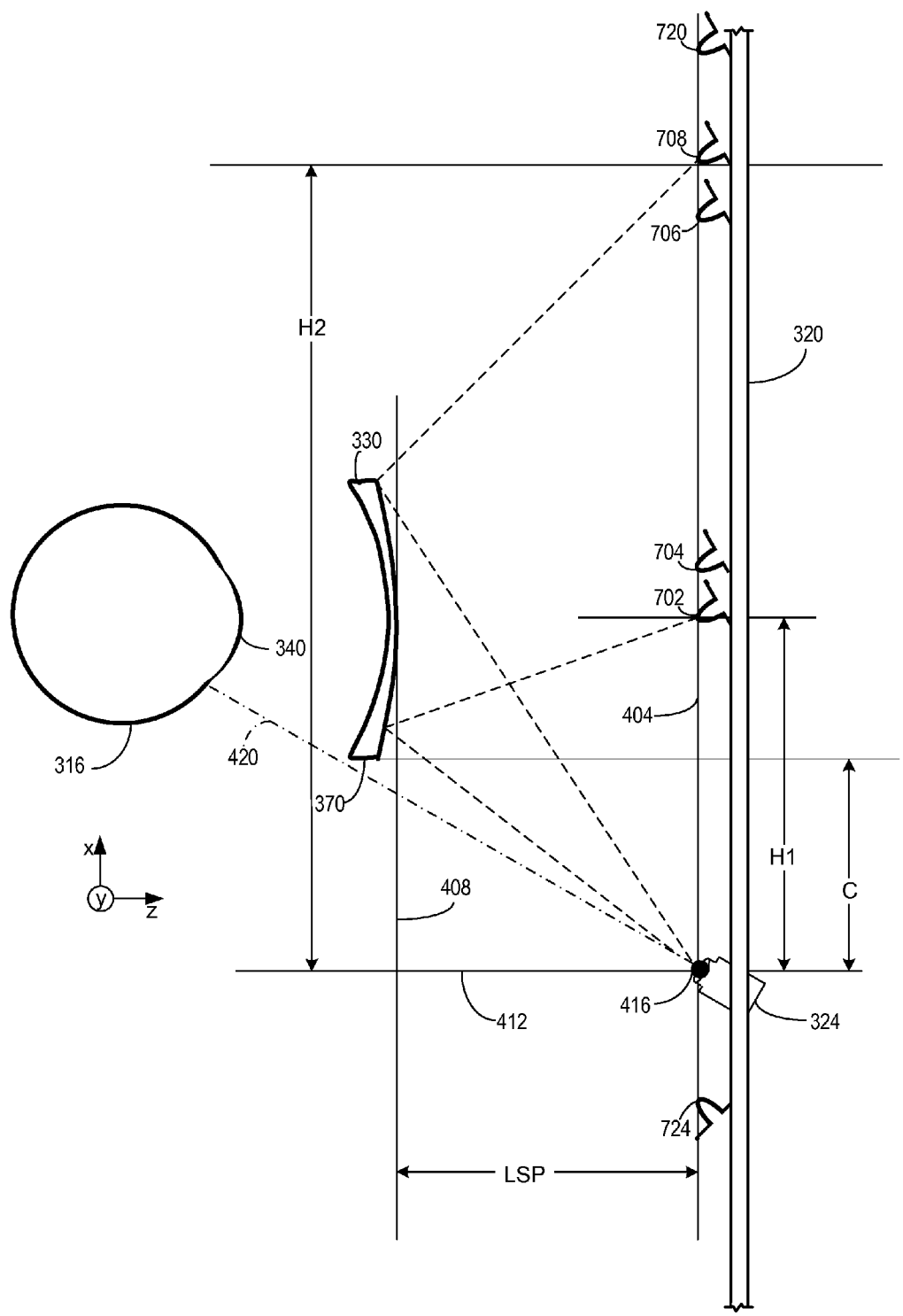
FIG. 7 is a schematic top view of a system for determining one or more characteristics of a lens of eyeglasses according to another example of the present disclosure.

Turning now to FIG. 7, a schematic top view of system 100 according to another example of the present disclosure is provided. In this example, 4 lens glint light sources 702, 704, 706 and 708 may be utilized and may be located in the light source plane 404 that is parallel to the lens plane 408 of the left lens 330. In this example, the light source plane 404 may be spaced from the lens plane 408 by an offset distance LSP in a z-axis direction of 30 mm.

The camera 324 may be coplanar with the light source plane 404. The camera 324 also may be located a distance C of 10 mm in the negative x-axis direction from a side edge 370 of the left lens 330. Additionally, each of the lens glint light sources 702, 704, 706 and 708 may be spaced horizontally in an x-axis direction from line 412 that is perpendicular to the light source plane 404 and extends through center point 416 of optical axis 420 of the camera 324 by a horizontal light source distance of between 20 mm and 120 mm. For example, lens glint light source 702 may be spaced horizontally in the x-axis direction from line 412 by horizontal light source distance H1 of 20 mm, and lens glint light source 708 may be spaced horizontally in the x-axis direction from line 412 by horizontal light source distance H2 of 120 mm.

In the example of FIG. 7, corneal glint light sources may be spaced horizontally in the x-axis direction from the line 412 by a horizontal light source distance that is either less than 20 mm or greater than 120 mm from line 412. In the example of FIG. 7, corneal glint light source 720 is spaced horizontally in the x-axis direction from the line 412 by a horizontal light source distance that is greater than horizontal light source distance H2 of 120 mm. Corneal glint light source 724 is spaced horizontally in the negative x-axis direction from the line 412 by a horizontal light source distance that is less than horizontal light source distance H1 of 13 mm. As shown in this example, corneal glint light source 724 is located to the side of the camera 324.

As noted above, FIG. 7 is schematic top view of system 100. In some examples, each of the lens glint light sources 702, 704, 706 and 708 may be spaced vertically in a positive y-axis direction from the center point 416 of camera 324 by a maximum distance of 30 mm. In some examples, each of the lens glint light sources 702, 704, 706 and 708 may be equally spaced in the y-axis direction from the center point 416. In other examples, one or more of the lens glint light sources 702, 704, 706 and 708 may be spaced in the y-axis direction from the center point 416 by different distances.

Figure 8:
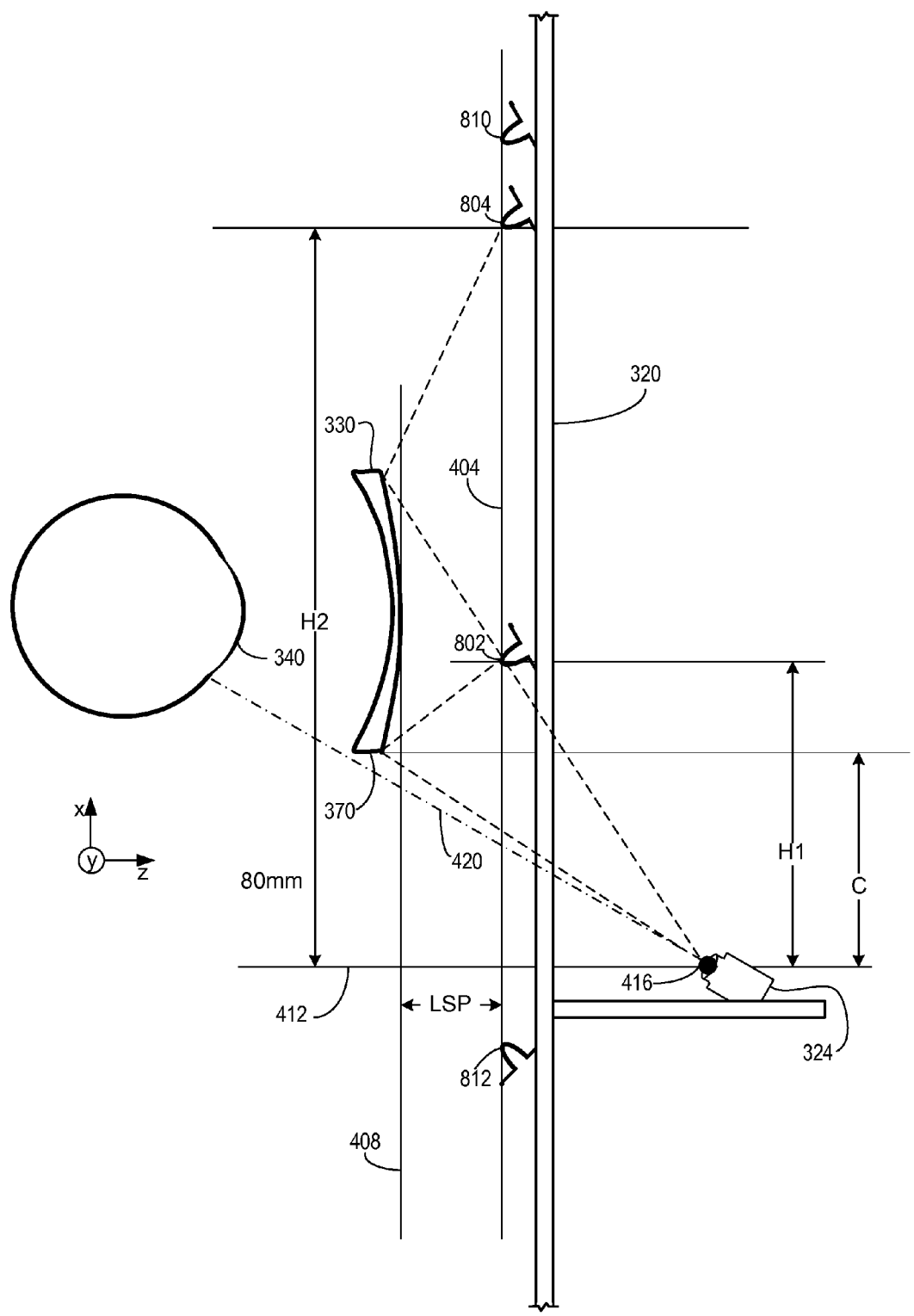
FIG. 8 is a schematic top view of a system for determining one or more characteristics of a lens of eyeglasses according to another example of the present disclosure.

With reference now to FIG. 8, a schematic top view of system 100 according to another example of the present disclosure is provided. In this example, 2 lens glint light sources 802 and 804 may be utilized and may be located in the light source plane 404 that is parallel to the lens plane 408 of the left lens 330. In this example, the light source plane 404 may be spaced from the lens plane 408 by an offset distance LSP in a z-axis direction of 100 mm.

The camera 324 may be spaced from the light source plane 404 in the z-axis direction by 20 mm, and may be spaced from the lens plane 408 in the z-axis direction by 30 mm. The camera 324 also may be located a distance C of 10 mm in the negative x-axis direction from a side edge 370 of the left lens 330. Additionally, each of the lens glint light sources 802 and 804 may be spaced horizontally in an x-axis direction from line 412 that is perpendicular to the light source plane 404 and extends through center point 416 of optical axis 420 of the camera 324 by a horizontal light source distance of between 13 mm and 80 mm. For example, lens glint light source 802 may be spaced horizontally in the x-axis direction from line 412 by horizontal light source distance H1 of 13 mm, and lens glint light source 804 may be spaced horizontally in the x-axis direction from line 412 by horizontal light source distance H2 of 80 mm.

In the example of FIG. 8, corneal glint light sources 34 may be spaced horizontally in the x-axis direction from the line 412 by a horizontal light source distance that is either less than 13 mm or greater than 80 mm from line 412. In the example of FIG. 8, corneal glint light source 810 is spaced horizontally in the x-axis direction from the line 412 by a horizontal light source distance that is greater than horizontal light source distance H2 of 80 mm. Corneal glint light source 812 is spaced horizontally in the negative x-axis direction from the line 412 by a horizontal light source distance that is less than horizontal light source distance H1 of 13 mm. As shown in this example, corneal glint light source 812 is located to the side of the camera 324.

As noted above, FIG. 8 is schematic top view of system 100. In some examples, each of the lens glint light sources 802 and 804 may be spaced vertically in a positive y-axis direction from the center point 416 of camera 324 by a maximum distance of 30 mm. In some examples, each of the lens glint light sources 802 and 804 may be equally spaced in the y-axis direction from the center point 416. In other examples, one or more of the lens glint light sources 802 and 804 may be spaced in the y-axis direction from the center point 416 by different distances.

Figure 9:
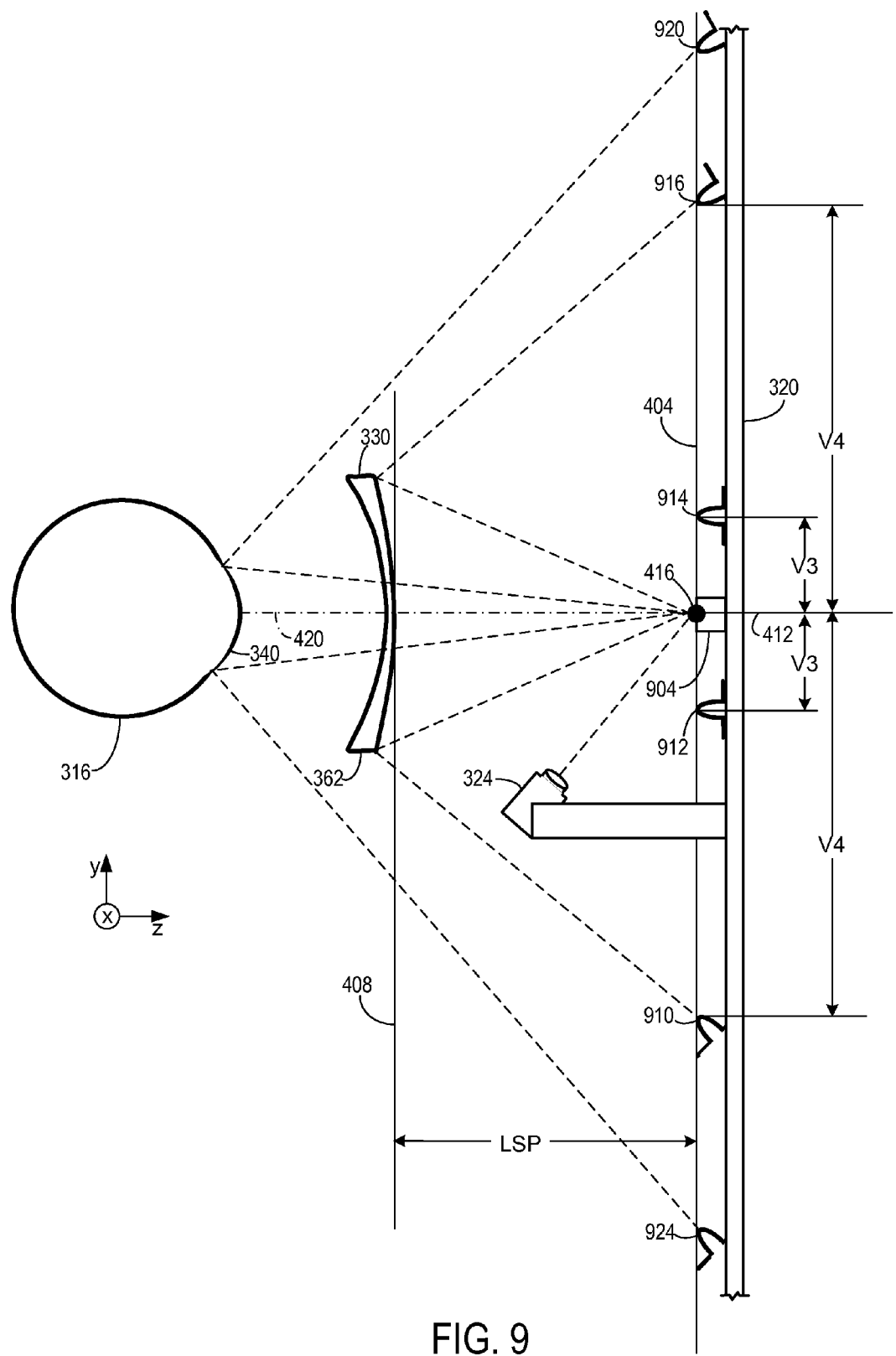
FIG. 9 is a schematic side view of a system for determining one or more characteristics of a lens of eyeglasses according to another example of the present disclosure.

With reference now to FIG. 9, a schematic side view of system 100 according to another example of the present disclosure is provided. In this example, a reverse optical path may be utilized to direct light rays from the left lens 330 and cornea 340 to the camera 324. For example, a hotmirror 904 may be configured to align the optical axis 420 of the camera 324 to be generally coaxial with the optical axis of the eye 316 as schematically illustrated in FIG. 9. In this example, the center point 416 of the optical axis 420 may be located on the hotmirror 904. It will be appreciated that other configurations of a reverse optical path utilizing other components, such as waveguides, prisms, optical wedges, etc., that align the optical axis 420 of the camera 324 to be generally coaxial with the optical axis of the eye 316 also may be utilized and are within the scope of the present disclosure. Additionally and in some examples, the optical axis 420 of camera 324 may be angularly offset from the optical axis of the eye 316 in a positive or negative y-axis direction by, for example, 10 degrees or less.

In this example and as noted above, the lens 330 may have a width in the x-axis direction of 50 mm and a height in the y-axis direction of 30 mm. Additionally, 4 lens glint light sources 910, 912, 914, and 916 may be utilized and may be located in the light source plane 404 that is parallel to the lens plane 408 of the left lens 330. In this example, the light source plane 404 may be spaced from the lens plane 408 by an offset distance LSP in a z-axis direction of 50 mm.

The center point 416 of optical axis 420 may be coplanar with the light source plane 404. Additionally, each of the lens glint light sources 910, 912, 914, and 916 may be spaced vertically in a y-axis direction from line 412, which is collinear with optical axis 420, by a vertical light source distance that is no greater than 50 mm. For example, each of lens glint light sources 912 and 914 may be spaced in the y-axis direction from line 412 by vertical light source distance V3 of 10 mm, and each of lens glint light sources 910 and 916 may be spaced in the y-axis direction from line 412 by vertical light source distance V4 of 50 mm.

In the example of FIG. 9, corneal glint light sources may be spaced vertically in the y-axis direction from the line 412 by a vertical light source distance that is greater than 50 mm. In the example of FIG. 9, both corneal glint light sources 920 and 924 are spaced in the y-axis direction from the line 412 by a vertical light source distance that is greater than the distance V4 of 50 mm.

As noted above, FIG. 9 is schematic side view of system 100. In some examples, each of the lens glint light sources 910, 912, 914, and 916 may be spaced horizontally in an x-axis direction from the center point 416 of camera 324 by a maximum distance of 30 mm. In some examples, each of the lens glint light sources and 910, 912, 914, and 916 may be equally spaced in the x-axis direction from the center point 416. In other examples, one or more of the lens glint light sources 910, 912, 914, and 916 may be spaced in the x-axis direction from the center point 416 by different distance.

It will be appreciated that in any of the above-described examples, the system 100 of the present disclosure may utilize 2, 3, 4, 5, 6, or any suitable number of lens glint light sources 32.

It will be appreciated that in some examples, reflections off eye glass lenses are stronger and can occlude reflections off the cornea of the eye. Accordingly and in some examples, the lens glint light sources may be cycled on/off in a manner that enables a balanced tradeoff between lens glints and corneal glints, and thereby facilitates acquisition of accurate corneal glint data.

Figure 10:
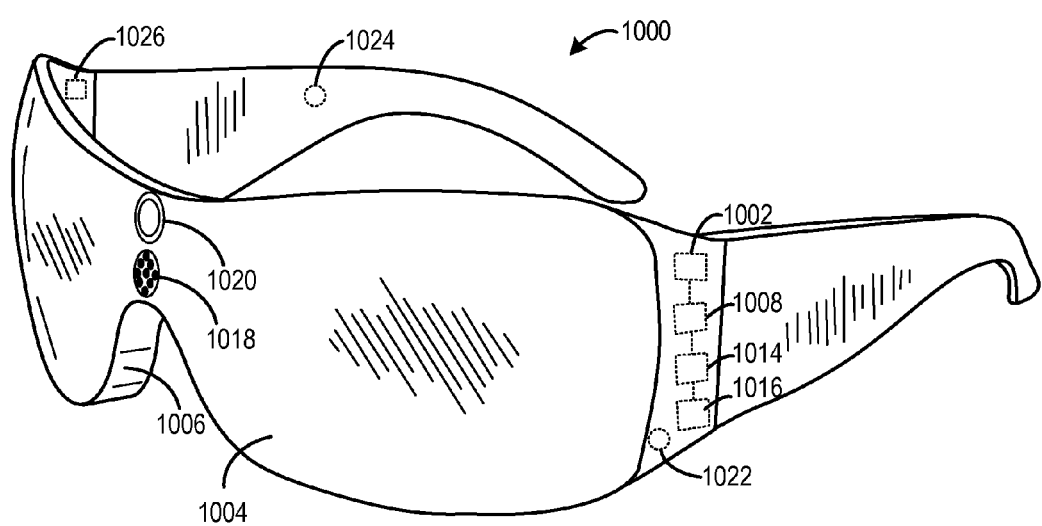
FIG. 10 is a simplified schematic illustration of a head-mounted display device according to an example of the present disclosure.

With reference now to FIG. 10, one example of an HMD device 1000 in the form of a pair of wearable glasses with a transparent display is provided. It will be appreciated that in other examples, the HMD device 1000 may take other suitable forms in which a transparent, semi-transparent, and/or non-transparent display is supported in front of a viewer's eye or eyes. It will also be appreciated that the HMD device 224 shown in FIG. 2 may take the form of the HMD device 1000, as described in more detail below, or any other suitable HMD device.

The HMD device 1000 includes a display system 10002 and a see-through or transparent display 1004 that enables images such as holographic objects to be delivered to the eyes of a wearer of the HMD device. The transparent display 1004 may be configured to visually augment an appearance of a real-world, physical environment to a wearer viewing the physical environment through the transparent display. For example, the appearance of the physical environment may be augmented by graphical content (e.g., one or more pixels each having a respective color and brightness) that is presented via the transparent display 1004 to create an augmented reality environment.

The transparent display 1004 may also be configured to enable a wearer of the HMD device to view a physical, real-world object in the physical environment through one or more partially transparent pixels that are displaying a virtual object representation. In some examples the transparent display 1004 may include image-producing elements located within lenses 1006 (such as, for example, a see-through Organic Light-Emitting Diode (OLED) display). As another example, the transparent display 1004 may include a light modulator on an edge of the lenses 1006. In this example, the lenses 1006 may serve as a light guide for delivering light from the light modulator to the eyes of a wearer. Such a light guide may enable a wearer to perceive a 3D holographic image located within the physical environment that the wearer is viewing, while also allowing the wearer to view physical objects in the physical environment, thus creating an augmented reality environment.

The HMD device 1000 may also include various sensors and related systems. For example, the HMD device 1000 may include an eye-tracking system 10008 that includes one or more image sensors configured to acquire image data in the form of gaze tracking data from a wearer's eyes. Provided the wearer has consented to the acquisition and use of this information, the eye-tracking system 10008 may use this information to track a position and/or movement of the wearer's eyes. In one example, the eye-tracking system 10008 includes a gaze detection subsystem configured to detect a direction of gaze of each eye of a wearer. The gaze detection subsystem may be configured to determine gaze directions of each of a wearer's eyes as described above or in any suitable manner.

The HMD device 1000 may also include sensor systems that receive physical environment data from the physical environment. For example, the HMD device 1000 may also include a head tracking system 10014 that utilizes one or more pose sensors, such as pose sensors 1016 on HMD device 1000, to capture head pose data and thereby enable position tracking, direction/location and orientation sensing, and/or motion detection of the wearer's head. Accordingly and as noted above, the head tracking system 10014 may receive sensor data from pose sensors 1016 that enable the orientation of the HMD device 1000 to be estimated in three degrees of freedom or the location and orientation of the HMD device to be estimated in six degrees of freedom.

In one example, head tracking system 10014 may comprise an inertial measurement unit (IMU) configured as a three-axis or three-degree of freedom position sensor system. This example position sensor system may, for example, include three gyroscopes to indicate or measure a change in orientation of the HMD device 1000 within 3D space about three orthogonal axes (e.g., x, y, and z, or roll, pitch, and yaw). The orientation derived from the sensor signals of the IMU may be used to display, via the transparent display 1004, one or more virtual objects with a body-locked position in which the position of each virtual object appears to be fixed relative to the wearer of the see-through display and the position of each virtual object appears to be moveable relative to real-world objects in the physical environment.

In another example, head tracking system 10014 may comprise an IMU configured as a six-axis or six-degree of freedom position sensor system. This example position sensor system may, for example, include three accelerometers and three gyroscopes to indicate or measure a change in location of the HMD device 1000 along the three orthogonal axes and a change in device orientation about the three orthogonal axes.

The head tracking system 10014 may also support other suitable positioning techniques, such as GPS or other global navigation systems. Further, while specific examples of position sensor systems have been described, it will be appreciated that any other suitable position sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

In some examples, the HMD device 1000 may also include an optical sensor system that utilizes one or more outward facing sensors, such as optical sensor 1018 on HMD device 1000, to capture image data. The outward facing sensor(s) may detect movements within its field of view, such as gesture-based inputs or other movements performed by a wearer or by a person or physical object within the field of view. The outward facing sensor(s) may also capture 2D image information and depth information from the physical environment and physical objects within the environment. For example, the outward facing sensor(s) may include a depth camera, a visible light camera, an infrared light camera, and/or a position tracking camera.

The optical sensor system may include a depth tracking system that generates depth tracking data via one or more depth cameras. In one example, each depth camera may include left and right cameras of a stereoscopic vision system. Time-resolved images from one or more of these depth cameras may be registered to each other and/or to images from another optical sensor such as a visible spectrum camera, and may be combined to yield depth-resolved video.

In other examples, a structured light depth camera may be configured to project a structured infrared illumination, and to image the illumination reflected from a scene onto which the illumination is projected. A depth map of the scene may be constructed based on spacings between adjacent features in the various regions of an imaged scene. In still other examples, a depth camera may take the form of a time-of-flight depth camera configured to project a pulsed infrared illumination onto a scene and detect the illumination reflected from the scene. For example, illumination may be provided by an infrared light source 1020. It will be appreciated that any other suitable depth camera may be used within the scope of the present disclosure.

The outward facing sensor(s) may capture images of the physical environment in which a wearer of the HMD device is situated. With respect to the HMD device 1000, in one example an augmented reality display enhancement program may include a 3D modeling system that uses such captured images to generate a virtual environment that models the physical environment surrounding the wearer of the HMD device. In some embodiments, the optical sensor 1018 may cooperate with the IMU to determine the location and the orientation of the HMD device 1000 in six degrees of freedom. Such location and orientation information may be used to display, via the transparent display 1004, one or more virtual objects with a world-locked position in which a position of each virtual object appears to be fixed relative to real-world objects viewable through the transparent display, and the position of each virtual object appears to be moveable relative to a wearer of the see-through display.

The HMD device 1000 may also include a microphone system that includes one or more microphones, such as microphone 1022, that capture audio data. In other examples, audio may be presented to the wearer via one or more speakers, such as speaker 1024 on the HMD device 1000.

The HMD device 1000 may also include a controller, such as controller 1026. The controller 1026 may include a logic subsystem and a storage subsystem, as discussed in more detail below with respect to FIG. 12, that are in communication with the various sensors and systems of the HMD device 1000. In one example, the storage subsystem may include instructions that are executable by the logic subsystem to receive signal inputs from the sensors, determine a pose of the HMD device 1000, and adjust display properties for content displayed via the transparent display 1004.

Figure 11A:
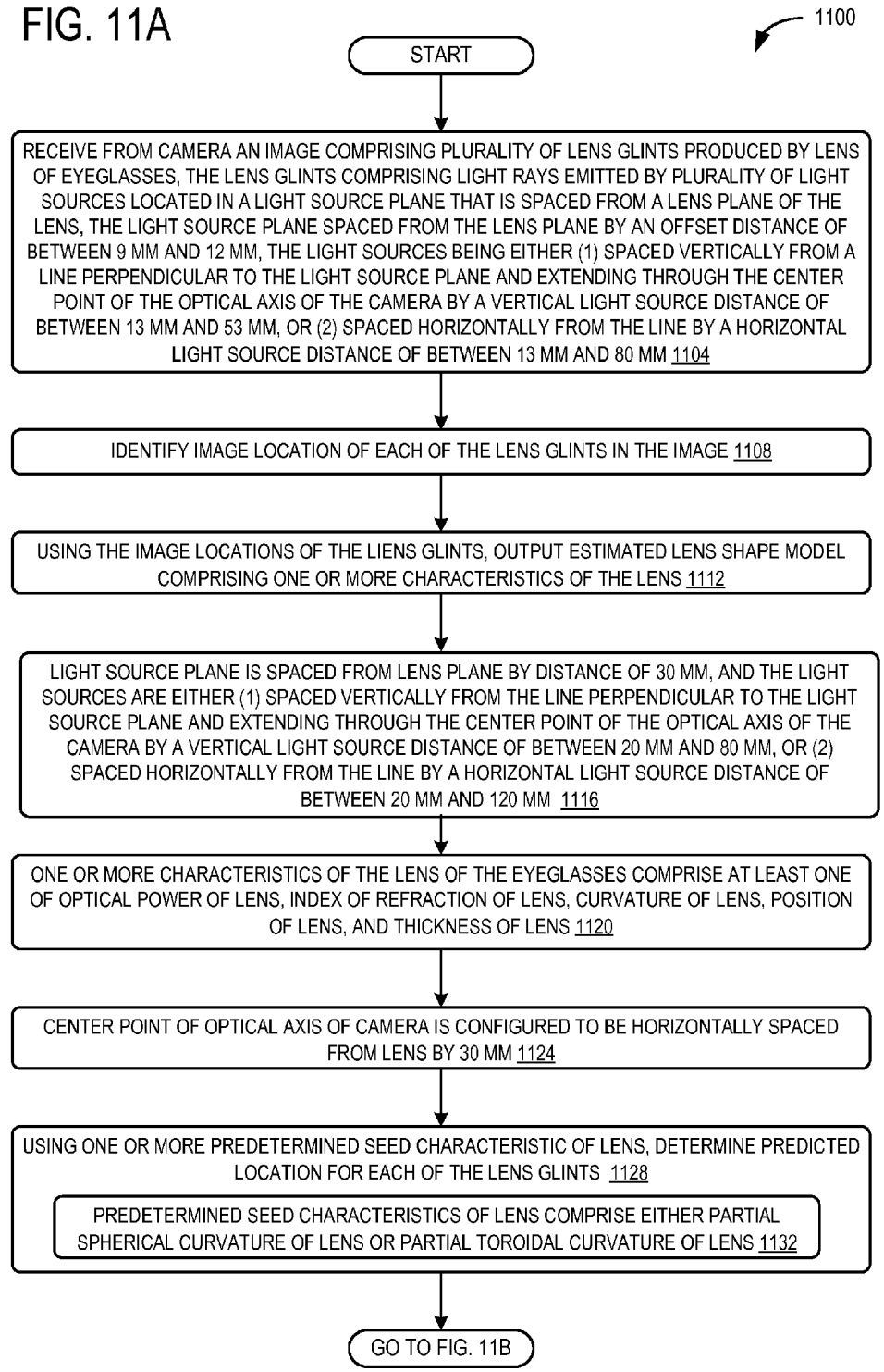
FIGS. 11A and 11B are a flow chart of a method for determining one or more characteristics of a lens of eyeglasses according to an embodiment of the present disclosure.
Figure 11B:
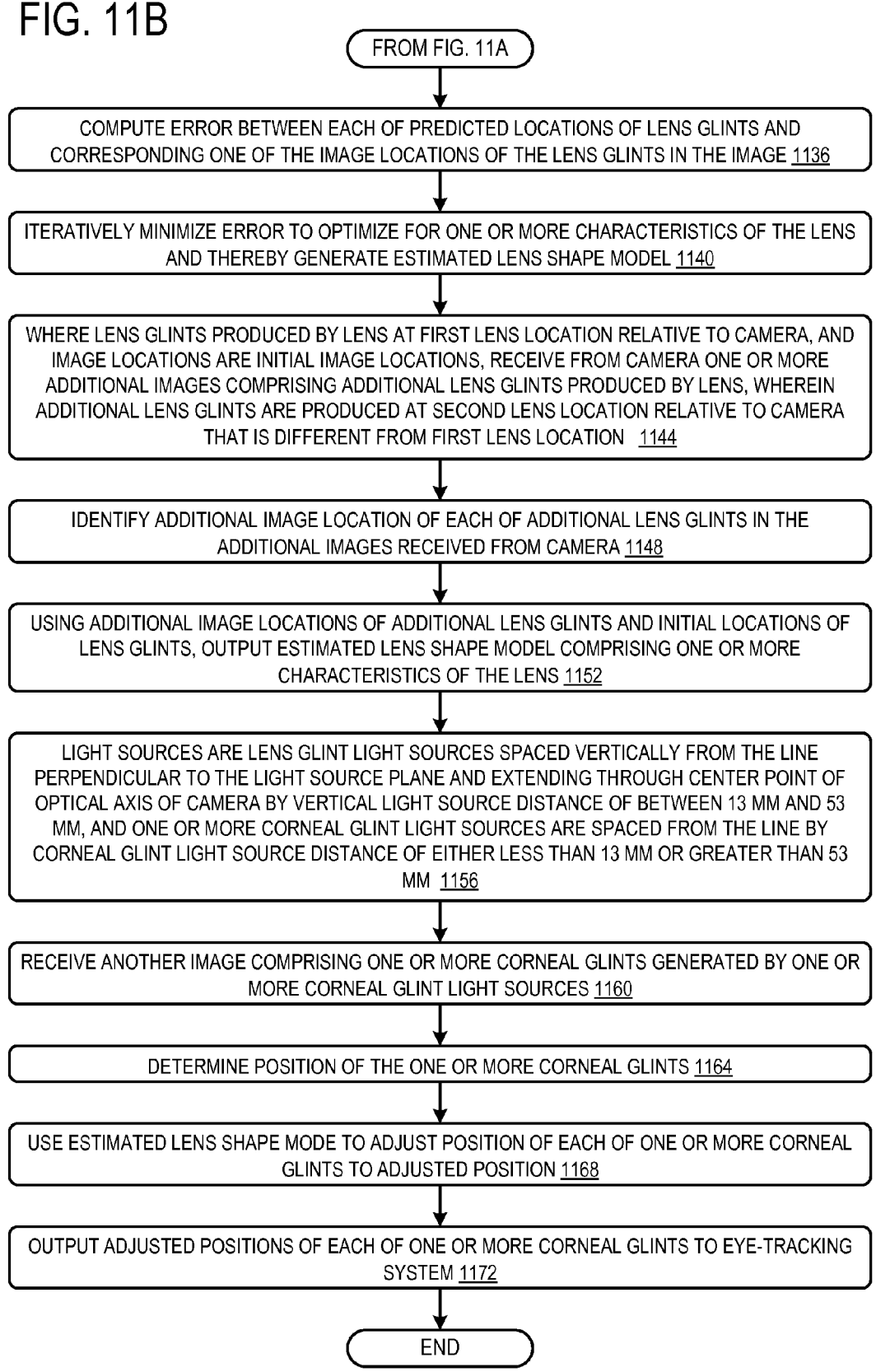

FIGS. 11A and 11B illustrate a flow chart of a method 1100 for navigating a hierarchy of visual elements according to an embodiment of the present disclosure. The following description of method 1100 is provided with reference to the software and hardware components of the system 100 described above and shown in FIGS. 1-10. It will be appreciated that method 1100 may also be performed in other contexts using other suitable hardware and software components.

With reference to FIG. 11A, at 1104 the method 1100 may include receiving from a camera an image comprising a plurality of lens glints produced by the lens of the eyeglasses, wherein the plurality of lens glints comprise light rays emitted by a plurality of light sources located in a light source plane that is spaced from a lens plane of the lens, the light source plane spaced from the lens plane by an offset distance of between 8 mm and 12 mm, the plurality of light sources being either (1) spaced vertically from a line perpendicular to the light source plane and extending through the center point of the optical axis of the camera by a vertical light source distance of between 13 mm and 53 mm, or (2) spaced horizontally from the line perpendicular to the light source plane and extending through the center point of the optical axis of the camera by a horizontal light source distance of between 13 mm and 80 mm.

At 1108 the method 1100 may include identifying an image location of each of the plurality of lens glints in the image received from the camera. At 1112 the method 1100 may include, using the image locations of the plurality of lens glints in the image, outputting an estimated lens shape model comprising the one or more characteristics of the lens of the eyeglasses. At 1116 the light source plane may be spaced from the lens plane by an offset distance of 30 mm, and the plurality of light sources may be either (1) spaced vertically from the line perpendicular to the light source plane and extending through the center point of the optical axis of the camera by a vertical light source distance of between 20 mm and 80 mm, or (2) spaced horizontally from the line perpendicular to the light source plane and extending through the center point of the optical axis of the camera by a horizontal light source distance of between 20 mm and 120 mm.

At 1120 the one or more characteristics of the lens of the eyeglasses may comprise at least one of an optical power of the lens, an index of refraction of the lens, a curvature of the lens, a position of the lens, and a thickness of the lens. At 1124 the center point of the optical axis of the camera may be horizontally spaced from the lens of the eyeglasses by 30 mm. At 1128 the method 1100 may include, using one or more predetermined seed characteristics of the lens, determining a predicted location for each of the plurality of lens glints. At 1132 the one or more predetermined seed characteristics of the lens may comprise either a partial spherical curvature of the lens or a partial toroidal curvature of the lens.

With reference now to FIG. 11B, at 1136 the method 1100 may include computing an error between each of the predicted locations of the plurality of lens glints and a corresponding one of the image locations of the plurality of lens glints in the image. At 1140 the method 1100 may include iteratively minimizing the error to optimize for the one or more characteristics of the lens of the eyeglasses and thereby generate the estimated lens shape model.

At 1144 the method 1100 may include, wherein the plurality of lens glints are produced by the lens of the eyeglasses at a first lens location relative to the camera, and the image locations are initial image locations, receiving from the camera one or more additional images comprising additional lens glints produced by the lens of the eyeglasses, wherein the additional lens glints are produced by the lens of the eyeglasses at a second lens location relative to the camera that is different from the first lens location. For example, the system 100 may provide a command to the user to shift the eyeglasses, after which the camera may capture the one or more additional images. In other examples, the lens glint light sources may be moved relative to the lens, such that light rays create the additional lens glints at the second lens location relative to the camera.

At 1148 the method 1100 may include identifying an additional image location of each of the additional lens glints in the one or more additional images received from the camera. At 1152 the method 1100 may include, using the additional image locations of the additional lens glints and the initial locations of the plurality of lens glints, outputting the estimated lens shape model comprising the one or more characteristics of the lens of the eyeglasses.

At 1156 the plurality of light sources may be lens glint light sources that are spaced vertically from the line perpendicular to the light source plane and extending through the center point of the optical axis of the camera by the vertical light source distance of between 13 mm and 53 mm, and one or more corneal glint light sources may be spaced vertically from the line perpendicular to the light source plane and extending through the center point of the optical axis of the camera by a corneal glint light source distance of either less than 13 mm or greater than 53 mm. At 1160 the method 1100 may include receiving another image comprising one or more corneal glints generated by the one or more corneal glint light sources. At 1164 the method 1100 may include determining a position of the one or more corneal glints. At 1168 the method 1100 may include using the estimated lens shape model to adjust the position of each of the one or more corneal glints to an adjusted position. At 1172 the method 1100 may include outputting the adjusted positions of each of the one or more corneal glints to an eye-tracking system.

It will be appreciated that method 1100 is provided by way of example and is not meant to be limiting. Therefore, it is to be understood that method 1100 may include additional and/or alternative steps than those illustrated in FIGS. 11A and 11B. Further, it is to be understood that method 1100 may be performed in any suitable order. Further still, it is to be understood that one or more steps may be omitted from method 1100 without departing from the scope of this disclosure.

Figure 12:
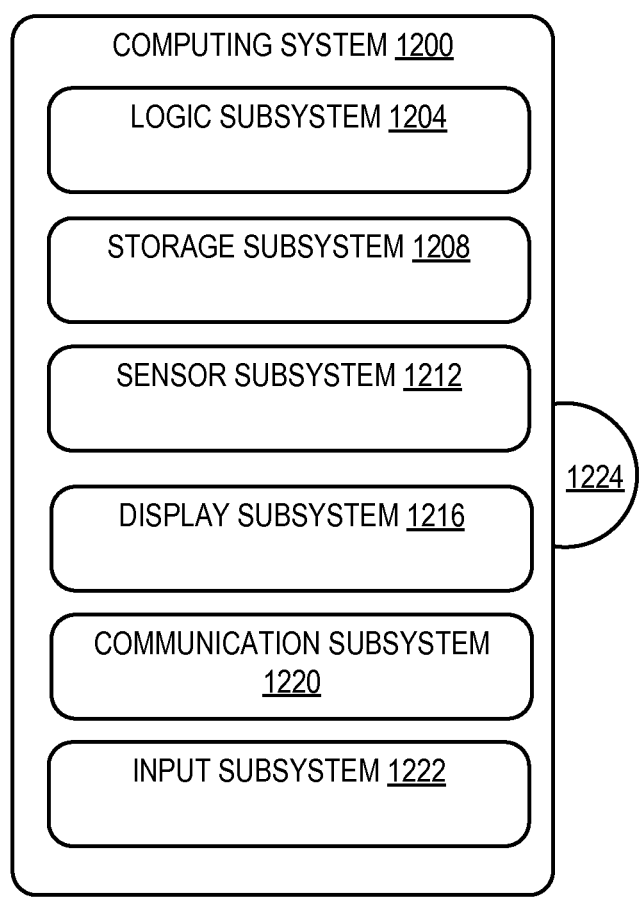
FIG. 12 is a simplified schematic illustration of an embodiment of a computing device.

FIG. 12 schematically shows a nonlimiting embodiment of a computing system 1200 that may perform one or more of the above described methods and processes. Computing device 22 may take the form of or include one or more aspects of computing system 1200. Computing system 1200 is shown in simplified form. It is to be understood that virtually any computer architecture may be used without departing from the scope of this disclosure. In different embodiments, computing system 1200 may take the form of a mainframe computer, server computer, desktop computer, laptop computer, tablet computer, home entertainment computer, network computing device, mobile computing device, mobile communication device, gaming device, etc.

As shown in FIG. 12, computing system 1200 includes a logic subsystem 1204, storage subsystem 1208, and sensor subsystem 1212. Computing system 1200 may optionally include a display subsystem 1216, communication subsystem 1220, input subsystem 1222 and/or other subsystems and components not shown in FIG. 12. Computing system 1200 may also include computer readable media, with the computer readable media including computer readable storage media and computer readable communication media. Computing system 1200 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 1204 may include one or more physical devices configured to execute one or more instructions. For example, the logic subsystem 1204 may be configured to execute one or more instructions that are part of one or more applications, services, programs, routines, libraries, objects, components, data structures, program logic or other logical constructs. Such instructions may be implemented to perform a task, implement a data type, transform the state of one or more devices, or otherwise arrive at a desired result.

The logic subsystem 1204 may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 1208 may include one or more physical, persistent devices configured to hold data and/or instructions executable by the logic subsystem 1204 to implement the herein described methods and processes. When such methods and processes are implemented, the state of storage subsystem 1208 may be transformed (e.g., to hold different data).

Storage subsystem 1208 may include removable media and/or built-in devices. Storage subsystem 1208 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 1208 may include devices with one or more of the following characteristics: volatile, nonvolatile, dynamic, static, read/write, read-only, random access, sequential access, location addressable, file addressable, and content addressable.

In some embodiments, aspects of logic subsystem 1204 and storage subsystem 1208 may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

FIG. 12 also shows an aspect of the storage subsystem 1208 in the form of removable computer readable storage media 1224, which may be used to store data and/or instructions executable to implement the methods and processes described herein. Removable computer-readable storage media 1224 may take the form of CDs, DVDs, HD-DVDs, Blu-Ray Discs, EEPROMs, and/or floppy disks, among others.

It is to be appreciated that storage subsystem 1208 includes one or more physical, persistent devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal via computer-readable communication media.

Sensor subsystem 1212 may include one or more sensors configured to sense different physical phenomenon (e.g., visible light, infrared light, sound, acceleration, orientation, position, etc.) as described above. Sensor subsystem 1212 may be configured to provide sensor data to logic subsystem 1204, for example. Such data may include image information, ambient lighting information, depth information, audio information, position information, motion information, user location information, and/or any other suitable sensor data that may be used to perform the methods and processes described above.

When included, display subsystem 1216 may be used to present a visual representation of data held by storage subsystem 1208. As the above described methods and processes change the data held by the storage subsystem 1208, and thus transform the state of the storage subsystem, the state of the display subsystem 1216 may likewise be transformed to visually represent changes in the underlying data. The display subsystem 1216 may include one or more display devices utilizing virtually any type of technology. Such display devices may be combined with logic subsystem 1204 and/or storage subsystem 1208 in a shared enclosure, or such display devices may be peripheral display devices.

When included, communication subsystem 1220 may be configured to communicatively couple computing system 1200 with one or more networks and/or one or more other computing devices. Communication subsystem 1220 may include wired and/or wireless communication devices compatible with one or more different communication protocols. As nonlimiting examples, the communication subsystem 1220 may be configured for communication via a wireless telephone network, a wireless local area network, a wired local area network, a wireless wide area network, a wired wide area network, etc. In some embodiments, the communication subsystem may allow computing system 1200 to send and/or receive messages to and/or from other devices via a network such as the Internet.

When included, input subsystem 1222 may comprise or interface with one or more sensors or user-input devices such as a game controller, gesture input detection device, voice recognizer, inertial measurement unit, keyboard, mouse, or touch screen. In some embodiments, the input subsystem 1222 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The term "program logic" may be used to describe an aspect of the system 100 that is implemented to perform one or more particular functions. In some cases, such program logic may be instantiated via logic subsystem 1204 executing instructions held by storage subsystem 1208. It is to be understood that different program logic may be instantiated from the same application, service, code block, object, library, routine, API, function, etc. Likewise, the same program logic may be instantiated by different applications, services, code blocks, objects, routines, APIs, functions, etc. The term "program logic" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A system for determining one or more characteristics of a lens of eyeglasses, the system comprising:
   a computing device;
   a head-mounted display device comprising:
      a frame;

a camera mounted to the frame and communicatively coupled to the computing device, the camera comprising an optical axis that includes a center point; and a plurality of light sources mounted to the frame and configured to emit light rays toward the lens to produce a plurality of lens glints from the lens, the plurality of light sources located in a light source plane that is spaced from a lens plane of the lens by an offset distance of between 8 mm and 12 mm, the plurality of light sources being either (1) spaced vertically from a line perpendicular to the light source plane and extending through the center point of the optical axis of the camera by a vertical light source distance of between 13 mm and 53 mm, or (2) spaced horizontally from the line perpendicular to the light source plane and extending through the center point of the optical axis of the camera by a horizontal light source distance of between 13 mm and 80 mm; and lens characterization program logic executed by a processor of the computing device, wherein the lens characterization program logic is configured to:

identify an image location of each of the plurality of lens glints in an image captured by the camera; and using the image locations of the plurality of lens glints in the image, output an estimated lens shape model comprising the one or more characteristics of the lens of the eyeglasses.

2. The system of claim 1, wherein the light source plane is spaced from the lens plane by an offset distance of 30 mm, and the plurality of light sources are either (1) spaced vertically from the line perpendicular to the light source plane and extending through the center point of the optical axis of the camera by a vertical light source distance of between 20 mm and 80 mm, or (2) spaced horizontally from the line perpendicular to the light source plane and extending through the center point of the optical axis of the camera by a horizontal light source distance of between 20 mm and 120 mm.

3. The system of claim 1, wherein the light source plane is spaced from the lens plane by an offset distance of 10 mm.

4. The system of claim 1, wherein the one or more characteristics of the lens of the eyeglasses comprise at least one of an optical power of the lens, an index of refraction of the lens, a curvature of the lens, a position of the lens, and a thickness of the lens.

5. The system of claim 1, wherein the center point of the optical axis of the camera is configured to be horizontally spaced from the lens of the eyeglasses by 30 mm.

6. The system of claim 1, wherein the lens characterization program logic is further configured to:

using one or more predetermined seed characteristics of the lens, determine a predicted location for each of the plurality of lens glints;

compute an error between each of the predicted locations of the plurality of lens glints and a corresponding one of the image locations of the plurality of lens glints in the image; and iteratively minimize the error to optimize for the one or more characteristics of the lens of the eyeglasses and thereby generate the estimated lens shape model.

7. The system of claim 6, where the one or more predetermined seed characteristics of the lens comprise either a partial spherical curvature of the lens or a partial toroidal curvature of the lens.

8. The system of claim 1, wherein the lens comprises an outer surface and an inner surface spaced from the outer surface, and the plurality of lens glints are produced by the outer surface and the inner surface.

9. The system of claim 1, wherein the plurality of light sources are lens glint light sources that are spaced vertically from the line perpendicular to the light source plane and extending through the center point of the optical axis of the camera by the vertical light source distance of between 13 mm and 53 mm, and the system further comprises one or more corneal glint light sources that are mounted to the frame and spaced from the line perpendicular to the light source plane and extending through the center point of the optical axis of the camera by a corneal glint light source distance of either less than 13 mm or greater than 53 mm.

10. The system of claim 9, wherein the lens characterization program logic is further configured to:

receive another image comprising one or more corneal glints generated by the one or more corneal glint light sources;

determine a position of the one or more corneal glints;

use the estimated lens shape model to adjust the position of each of the one or more corneal glints to an adjusted position; and output the adjusted positions of each of the one or more corneal glints to an eye-tracking system.

11. A method for determining one or more characteristics of a lens of eyeglasses, the method comprising:

receiving from a camera an image comprising a plurality of lens glints produced by the lens of the eyeglasses, wherein the plurality of lens glints comprise light rays emitted by a plurality of light sources located in a light source plane that is spaced from a lens plane of the lens, the light source plane spaced from the lens plane by an offset distance of between 8 mm and 12 mm, the plurality of light sources being either (1) spaced vertically from a line perpendicular to the light source plane and extending through the center point of the optical axis of the camera by a vertical light source distance of between 13 mm and 53 mm, or (2) spaced horizontally from the line perpendicular to the light source plane and extending through the center point of the optical axis of the camera by a horizontal light source distance of between 13 mm and 80 mm;

identifying an image location of each of the plurality of lens glints in the image received from the camera; and using the image locations of the plurality of lens glints in the image, outputting an estimated lens shape model comprising the one or more characteristics of the lens of the eyeglasses.

12. The method of claim 11, wherein the light source plane is spaced from the lens plane by an offset distance of 30 mm, and the plurality of light sources are either (1) spaced vertically from the line perpendicular to the light source plane and extending through the center point of the optical axis of the camera by a vertical light source distance of between 20 mm and 80 mm, or (2) spaced horizontally from the line perpendicular to the light source plane and extending through the center point of the optical axis of the camera by a horizontal light source distance of between 20 mm and 120 mm.

13. The method of claim 11, wherein the one or more characteristics of the lens of the eyeglasses comprise at least one of an optical power of the lens, an index of refraction of the lens, a curvature of the lens, a position of the lens, and a thickness of the lens.

14. The method of claim 11, wherein the center point of the optical axis of the camera is configured to be horizontally spaced from the lens of the eyeglasses by 30 mm.

15. The method of claim 11, further comprising:
using one or more predetermined seed characteristics of the lens, determining a predicted location for each of the plurality of lens glints;
computing an error between each of the predicted locations of the plurality of lens glints and a corresponding one of the image locations of the plurality of lens glints in the image; and
iteratively minimizing the error to optimize for the one or more characteristics of the lens of the eyeglasses and thereby generate the estimated lens shape model.

16. The method of claim 15, where the one or more predetermined seed characteristics of the lens comprise either a partial spherical curvature of the lens or a partial toroidal curvature of the lens.

17. The method of claim 11, wherein the plurality of lens glints are produced by the lens of the eyeglasses at a first lens location relative to the camera, and the image locations are initial image locations, the method further comprising:
receiving from the camera one or more additional images comprising additional lens glints produced by the lens of the eyeglasses, wherein the additional lens glints are produced by the lens of the eyeglasses at a second lens location relative to the camera that is different from the first lens location;
identifying an additional image location of each of the additional lens glints in the one or more additional images received from the camera; and
using the additional image locations of the additional lens glints and the initial locations of the plurality of lens glints, outputting the estimated lens shape model comprising the one or more characteristics of the lens of the eyeglasses.

18. The method of claim 11, wherein the plurality of light sources are lens glint light sources that are spaced vertically from the line perpendicular to the light source plane and extending through the center point of the optical axis of the camera by the vertical light source distance of between 13 mm and 53 mm, and one or more corneal glint light sources are mounted to the frame and spaced from the line perpendicular to the light source plane and extending through the center point of the optical axis of the camera by a corneal glint light source distance of either less than 13 mm or greater than 53 mm.

19. The method of claim 18, further comprising:
receiving another image comprising one or more corneal glints generated by the one or more corneal glint light sources;
determining a position of the one or more corneal glints;
using the estimated lens shape model to adjust the position of each of the one or more corneal glints to an adjusted position; and
outputting the adjusted positions of each of the one or more corneal glints to an eye-tracking system.

20. A method for determining one or more characteristics of a lens of eyeglasses, the method comprising:
receiving from a camera mounted to a display device an image comprising a plurality of lens glints produced by the lens of the eyeglasses, wherein the plurality of lens glints comprise light rays emitted by a plurality of light sources mounted to the display device and located in a light source plane that is spaced from a lens plane of the lens, the plurality of light sources being spaced from a line perpendicular to the light source plane and extending through the center point of the optical axis of the camera by a light source distance of between 13 mm and 120 mm;
identifying an image location of each of the plurality of lens glints in the image received from the camera;
using the image locations of the plurality of lens glints in the image, outputting an estimated lens shape model comprising the one or more characteristics of the lens of the eyeglasses;
receiving another image comprising one or more corneal glints generated by one or more corneal glint light sources mounted to the display device, at least one of the one or more corneal glint light sources being spaced from the line perpendicular to the light source plane and extending through the center point of the optical axis of the camera by a corneal glint light source distance of either less than 13 mm or greater than 53 mm;
determining a position of the one or more corneal glints;
using the estimated lens shape model to adjust the position of each of the one or more corneal glints to an adjusted position; and
outputting the adjusted positions of each of the one or more corneal glints to an eye-tracking system.

* * * * *